US008605159B2

(12) United States Patent
Nishiyama

(10) Patent No.: US 8,605,159 B2
(45) Date of Patent: Dec. 10, 2013

(54) IMAGE PROCESSING APPARATUS AND IMAGE PROCESSING METHOD WITH BLUR CORRECTION BASED ON EXPOSURE INFORMATION AND ANGLE OF ROTATION

(75) Inventor: Tomohiro Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 12/995,765

(22) PCT Filed: Jul. 31, 2009

(86) PCT No.: PCT/JP2009/063976
§ 371 (c)(1),
(2), (4) Date: Dec. 2, 2010

(87) PCT Pub. No.: WO2010/021249
PCT Pub. Date: Feb. 25, 2010

(65) Prior Publication Data
US 2011/0141298 A1 Jun. 16, 2011

(30) Foreign Application Priority Data
Aug. 21, 2008 (JP) .................................. 2008-213225

(51) Int. Cl.
*H04N 5/228* (2006.01)
*G06K 9/40* (2006.01)

(52) U.S. Cl.
USPC .................. 348/208.5; 348/208.4; 348/208.1; 348/208.2; 396/52; 396/55

(58) Field of Classification Search
None
See application file for complete search history.

(56) References Cited

U.S. PATENT DOCUMENTS

| 6,992,700 B1* | 1/2006 | Sato et al. ................... 348/208.2 |
| 7,295,232 B2 | 11/2007 | Washisu |
| 2003/0002746 A1* | 1/2003 | Kusaka ......................... 382/255 |
| 2006/0017813 A1* | 1/2006 | Okubo et al. ............... 348/208.2 |
| 2006/0197843 A1* | 9/2006 | Yoshimatsu ............... 348/219.1 |
| 2007/0258707 A1* | 11/2007 | Raskar ............................ 396/52 |
| 2008/0012947 A1* | 1/2008 | Uenaka ..................... 348/208.11 |
| 2008/0013850 A1* | 1/2008 | Sakurai et al. ................ 382/255 |

(Continued)

FOREIGN PATENT DOCUMENTS

| JP | 2004-219765 A | 8/2004 |
| JP | 2006-203504 A | 8/2006 |
| JP | 2008-042847 A | 2/2008 |

(Continued)

OTHER PUBLICATIONS

Hiroyuki Ohtsuki, et al., "An Image Matching Algorithm Based on Rotation Invariant Phase-Only Correlation and Its Evaluation", Society of Instrument and Control Engineers, Tohoku Chapter, 194th Workshop, Jun. 1, 2001, File No. 194-7, pp. 1-9.
Nov. 10, 2009 International Search Report and Written Opinion in PCT/JP2009/063976.

*Primary Examiner* — James M Hannett
*Assistant Examiner* — Dwight C Tejano
(74) *Attorney, Agent, or Firm* — Fitzpatrick, Cella, Harper & Scinto

(57) ABSTRACT

Image data captured by a capturing unit is inputted. Exposure information of the captured image data is inputted. Rotary-vibration information, which indicates rotary vibration of the capturing unit at the time of image capture, is inputted. A blur, which is caused by the rotary vibration, of the captured image data is corrected based on the exposure information and an angle of rotation of the capturing unit, which is indicated by the rotary-vibration information.

8 Claims, 9 Drawing Sheets

(56) References Cited

U.S. PATENT DOCUMENTS

| | | | |
|---|---|---|---|
| 2008/0100716 A1* | 5/2008 | Fu et al. | 348/208.8 |
| 2009/0115856 A1 | 5/2009 | Washisu | |
| 2009/0219402 A1* | 9/2009 | Schneider | 348/208.7 |
| 2010/0245603 A1* | 9/2010 | Hashi et al. | 348/208.5 |

FOREIGN PATENT DOCUMENTS

| | | |
|---|---|---|
| JP | 2008-42874 A | 2/2008 |
| JP | 2008-167255 A | 7/2008 |
| WO | 2007/023663 A1 | 3/2007 |
| WO | 2007/129762 A2 | 11/2007 |

* cited by examiner

IMAGE PROCESSING APPARATUS AND IMAGE PROCESSING METHOD WITH BLUR CORRECTION BASED ON EXPOSURE INFORMATION AND ANGLE OF ROTATION

TECHNICAL FIELD

The present invention relates to an image processing apparatus and image processing method. More particularly, the invention relates to an image processing apparatus and image processing method for correcting for blurring of an image due to camera shake.

BACKGROUND ART

In order to correct for camera shake of a captured image due to camera shake, use is made of a camera having an image-stabilization function. In general, a camera with an image-stabilization function employs a method (an optical image-stabilization method) of correcting for camera shake optically by combining a gyro sensor for detecting angular speed due to camera shake and a driving unit for controlling the relative positions of a lens and an image sensor so as to cancel out camera shake.

A method (a digital image-stabilization method) has been proposed in which a plurality of images are captured at an exposure time quickly enough to avoid camera shake, namely at a high shutter speed, after which these images are electrically registered and superimposed to thereby generate an image not influenced by camera shake (e.g., see the specification of Japanese Patent Laid-Open No. 2004-219765). This technique makes it possible to correct for blur in a case where the camera is shifted slightly vertically, horizontally or diagonally (this vibration will be referred to as "shift vibration" below). However, this technique cannot correct for blur in a case where the camera is rotated about a shooting axis such as the optic axis of the lens (this vibration will be referred to as "rotary vibration" below).

Further, a technique described in the specification of Japanese Patent Laid-Open No. 2006-203504 approximates the rotary-vibration vector by a straight line on the assumption that rotary vibration is small, obtains the correlation among a plurality of images and obtains the rotary-vibration vector and a shift-vibration vector. In other words, this is a technique for linearly approximating rotary vibration and dealing with it in the same manner as the shift-vibration vector.

On the other hand, algorithms for detecting differences between rotational angles of a plurality of images have been intensively researched in recent years especially in view of demand originating from fingerprint authentication applications. For example, a method described in, for example, "Society of Instrument and Control Engineers, Tohoku Chapter, 194$^{th}$ Workshop (2001.6.1), File No. 194-7" detects the difference between rotational angles by replacing rotary motion with translational motion using polar coordinates.

However, the three above-described techniques for combining a plurality of images have certain problems, set forth below.

With the first technique, rotary vibration can be corrected, as mentioned above.

The second technique deals with rotary vibration but, as a pre-condition, ignores rotary vibration while the shutter is open. This means that a decline in the accuracy of rotary-vibration correction is unavoidable. Further, a plurality of images are required for the correction and the problem that arises is consumption of available memory. A further problem is that the motion vector is approximated by a straight line on the assumption that the angle of rotary vibration is small. This also means that a decline in the accuracy of rotary-vibration correction is unavoidable. Moreover, in order to combine a plurality of images and correct for rotary vibration correctly, accurate image registration is required.

With the third technique, angle of rotation can be detected accurately since polar coordinates are used for detection of rotational angle without approximating rotary vibration by a straight line. However, there is no point of view using a transformation between polar coordinates and real space in order to correct for rotary vibration.

DISCLOSURE OF INVENTION

In one aspect, an image processing apparatus comprises: a first input unit configured to input image data captured by a capturing unit; a second input unit configured to input exposure information of the captured image data; a third input unit configured to input rotary-vibration information indicating rotary vibration of the capturing unit at the time of image capture; and a corrector configured to correct for a blur, which is caused by the rotary vibration, of the captured image data based on the exposure information and an angle of rotation of the capturing unit, which is indicated by the rotary-vibration information.

In another aspect, an image processing method comprises the steps of: inputting image data captured by a capturing unit; inputting exposure information of the captured image data; inputting rotary-vibration information indicating rotary vibration of the capturing unit at the time of image capture; and correcting for a blur, which is caused by the rotary vibration, of the captured image data based on the exposure information and an angle of rotation of the capturing unit, which is indicated by the rotary-vibration information.

According to these aspects, rotary vibration of captured image data can be corrected for effectively.

Further features of the present invention will become apparent from the following description of exemplary embodiments with reference to the attached drawings.

BEST MODE FOR CARRYING OUT THE INVENTION

An image processing apparatus and image processing method according to an embodiment of the present invention will now be described in detail with reference to the drawings.

First Embodiment

In a first embodiment, image processing which corrects for rotary vibration using captured image data equivalent to one image will be described. It will be assumed that vibration other than rotary vibration (e.g., shift vibration, etc.) has been eliminated by a correction using an optical image-stabilization mechanism installed in an image capturing device incorporating an image processing unit. In this specification, the term "vibration" is used to express not only movement back and forth or side to side, but also an inadvertent jolt or shift resulting in a displacement in one direction at a non-constant speed.

[Configuration of Apparatus]

Figure 1:
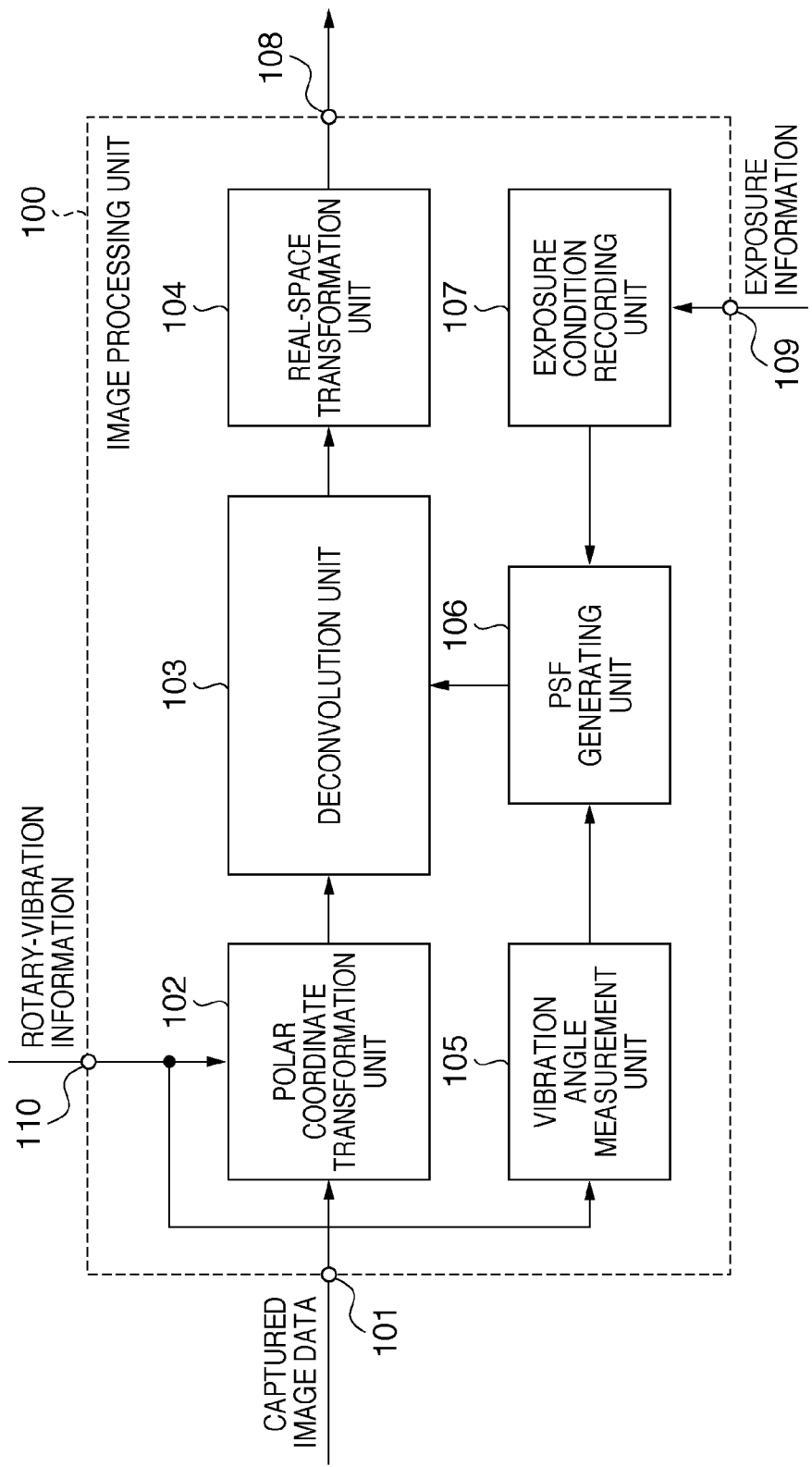
FIG. 1 is a block diagram illustrating the configuration of an image processing unit according to an embodiment.

FIG. 1 is a block diagram illustrating the configuration of an image processing unit 100 according to this embodiment.

Captured image data captured by an image capturing device is input to a terminal 101. A polar coordinate transformation unit 102 receives this input from the terminal 101 and converts this captured image data to an image in polar coordinates. At this time the polar coordinate transformation unit 102 causes the origin of the polar coordinates to coincide with the positional coordinates of the center of rotation represented by rotary-vibration information that enters from a terminal 110. It should be noted that the captured image data is data, prior to demosaicing, obtained by applying an analog-to-digital (A/D) conversion to a signal that has been output from an image sensing device such as a charge-coupled device (CCD) or CMOS sensor. (There are cases where this data is referred to as RAW data below.)

Based upon the rotary-vibration information that enters from the terminal 110, a vibration angle measurement unit 105 measures the angle of rotation of the image capturing device due to camera shake. An exposure condition recording unit 107 records information (exposure information) indicating a shutter-open period that enters from a terminal 109. Information from the vibration angle measurement unit 105 and the information from the exposure condition recording unit 107 are input to a PSF (point spread function) generating unit 106, which generates a PSF in polar coordinates.

The PSF generated by the PSF generating unit 106 is input to a deconvolution unit 103, which performs deconvolution. A real-space transformation unit 104 converts an image, which is output by the deconvolution unit 103, to a real space again and outputs RAW data, which is the result of the conversion, to a terminal 108.

It should be noted that image data following demosaicing (e.g., RGB data) may be input to the image processing unit 100, which may then proceed to execute the above-described processing and output image data.

[Image Processing]

Figure 2:
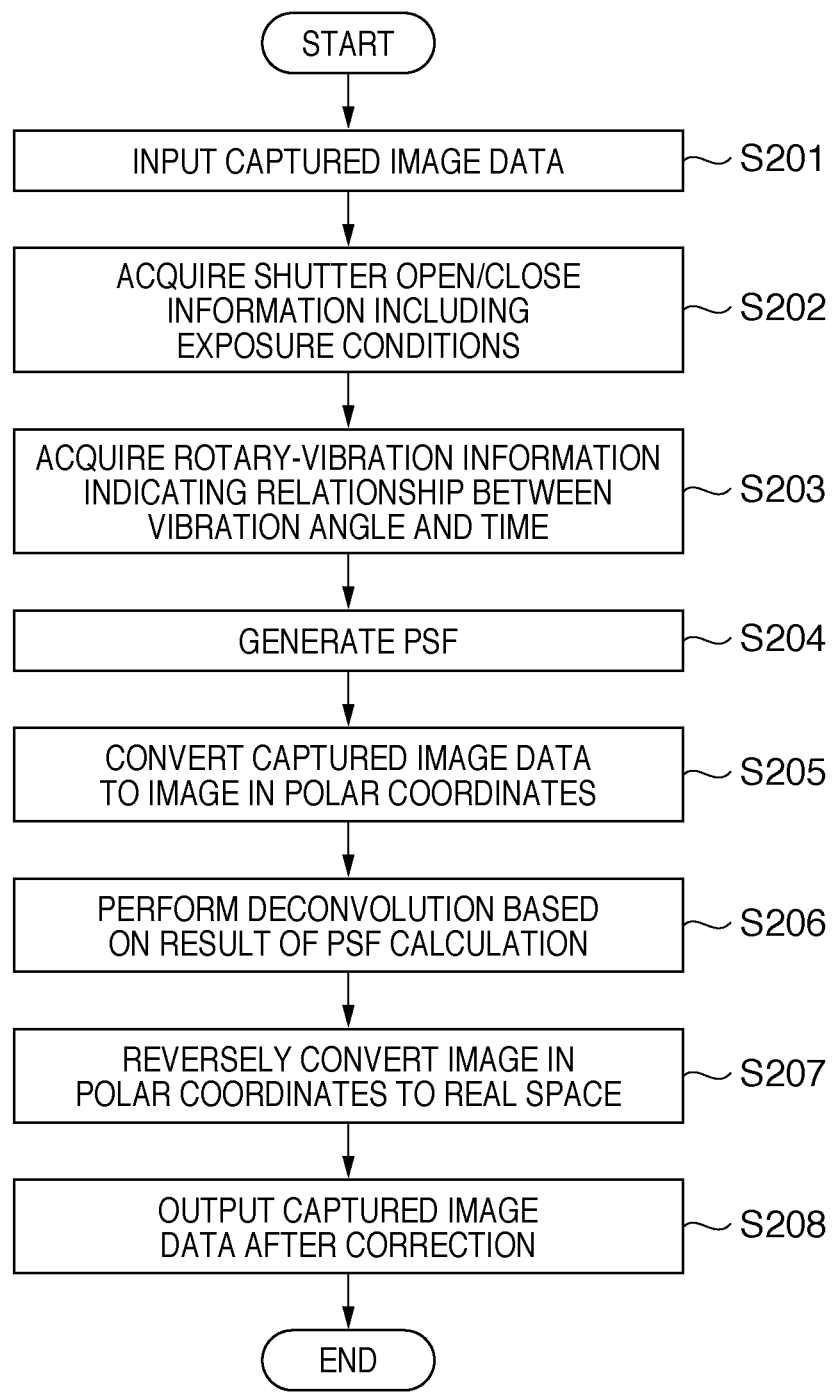
FIG. 2 is a flowchart useful in describing processing executed by the image processing unit.

FIG. 2 is a flowchart for describing the processing executed by the image processing unit 100.

Captured image data is input to the polar coordinate transformation unit 102 (S201). Here let I(x,y) represent the intensity of light that impinges upon a pixel (x,y) of the image sensing device per unit time, let ω(t) represent the angular speed of rotary vibration, and let T represent exposure time. Assuming that a point, which arrives in coordinates (x,y) at the time t, is located coordinates (x·cos θ(t)+y·sin θ(t), −x·sin θ(t)+y·cos θ(t)) at the time t=0, and that image data without vibration is represented by I(x,y) in the time t=0, captured image data $I_{blur}(x,y)$ is represented by the equations below. The origin of the coordinate system is made to coincide with the positional coordinates of the center of rotation represented by the rotary-vibration information, as mentioned above.

$$I_{blur}(x, y) = 1/T \cdot \int_t h(t)I\{x \cdot \cos\theta(t) + y \cdot \sin\theta(t), -x \cdot \sin\theta(t) + y \cdot \cos\theta(t)\}dt \quad (1)$$

$$= 1/T \cdot \int_\theta h(\theta)/\omega(\theta) \cdot I\{x \cdot \cos\theta + y \cdot \sin\theta, -x \cdot \sin\theta + y \cdot \cos\theta\}d\theta \quad (2)$$

$$= 1/T \cdot \int_\theta h'(\theta) \cdot I\{x \cdot \cos\theta + y \cdot \sin\theta, -x \cdot \sin\theta + y \cdot \cos\theta\}d\theta \quad (3)$$

Here the function h(t) represents shutter open/close, where shutter open is 1 and shutter closed is 0. The ranges of integration are t=0~T, θ=0~$\theta_T$.

In the transformation from Equation (1) to Equation (2), the integration variable is converted, and ω(t)=dθ/dt holds. Further, ω(θ) is a function in which use is made of the relationship between t and θ and h(t) is rewritten with θ as a variable. Similarly, h(θ) is a function in which use is made of the relationship between t and θ and h(t) is rewritten with θ as a variable. Further, in Equation (3), h'(θ)=h(θ)/ω(θ) holds.

Next, the exposure condition recording unit 107 acquires exposure information indicating the shutter-open time period (S202). Further, the vibration angle measurement unit 105 acquires rotary-vibration information indicating the relationship between vibration angle θ and time (S203). Although the details will be described later, the PSF generating unit 106 calculates h'(θ), which is the PSF in polar coordinates, based upon the data that enters from the vibration angle measurement unit 105 and exposure condition recording unit 107 (S204).

The polar coordinate transformation unit 102 converts the captured image data to an image in polar coordinates (S205). As mentioned above, the origin of the orthogonal coordinate system in this transformation is made to coincide with the coordinates of the center of rotation indicated by the rotary-vibration information that enters from the terminal 110. The transformation to Equation (3) or (4) is performed by this polar coordinate transformation.

$$I_{blur}(r, \Theta) = 1/T \cdot \int_\theta h'(\theta)I(r, \Theta - \theta)d\theta \quad (4)$$

$$= 1/T \cdot (h' * I)(r, \Theta)$$

Here (x,y) in Equation (3) represents r(cos Θ, sin Θ), and * represents a convolution computation.

Equation (4) is an equation the same as that of vibration with respect to translational motion and can be regarded as the result of performing a convolution based upon h'(θ), which is the PSF. However, Equation (4) is a logical equation and the actual data is a digital value. Therefore, interpolation of some kind is necessary in order to make the transformation from real space to polar coordinate space. Although any interpolation method can be used, here the bicubic method will be used.

Although the details will be described later, the deconvolution unit 103 performs a deconvolution, which cancels out the convolution of Equation (4), based upon the result of calculation by the PSF generating unit 106 (S206). It will suffice to use any existing algorithm as the deconvolution algorithm. For example, division in frequency space, the Lucy-Richardson algorithm, an algorithm using the Wiener filter or an algorithm using a normalized filter can be mentioned. In this embodiment, the shape of h'(θ) is controlled by controlling shutter open/close, and division is performed in frequency space. The details will be described later.

Since I(r,Θ) is obtained by deconvolution, the real-space transformation unit 104 reversely converts I(r,Θ) to real-space representation I(x,y) (S207). The reverse conversion also requires interpolation processing similar to the transformation from real space to polar coordinate space. The real-space transformation unit 104 outputs I(x,y) to an output terminal 108 as captured image data after correction (S208).

Figure 3:
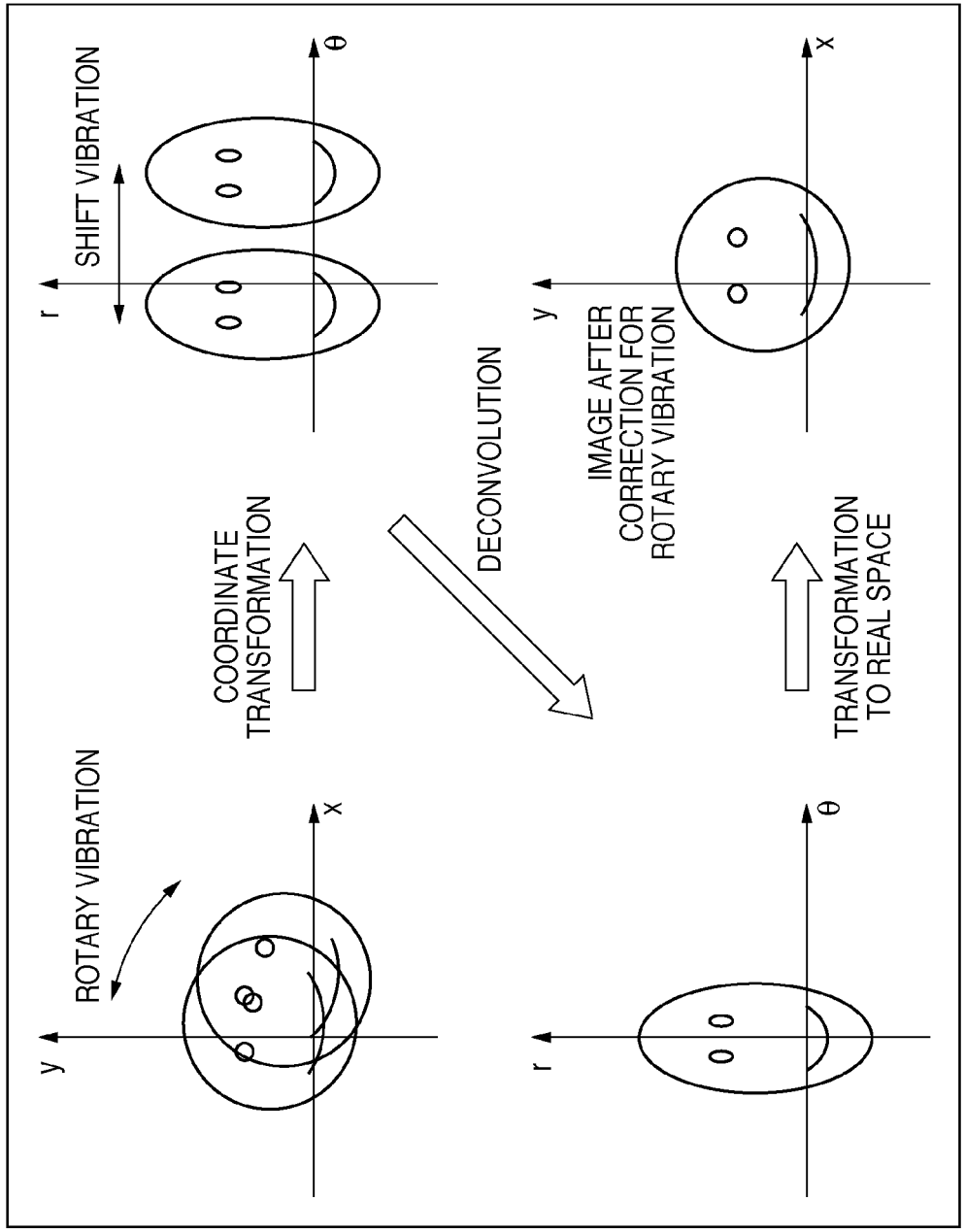
FIG. 3 is a diagram conceptually representing the principle of operation of the image processing unit.

FIG. 3 is a diagram conceptually representing the principle of operation of the image processing unit 100. Specifically, rotary vibration is converted to vibration (shift vibration) along the axial direction of angle Θ by the polar coordinate transformation, and shift vibration of the image is removed by deconvolution. The image from which shift vibration has been removed is restored to a real space and an image from which rotary vibration has been removed is obtained.

[PSF Generation Method]

Figure 4:
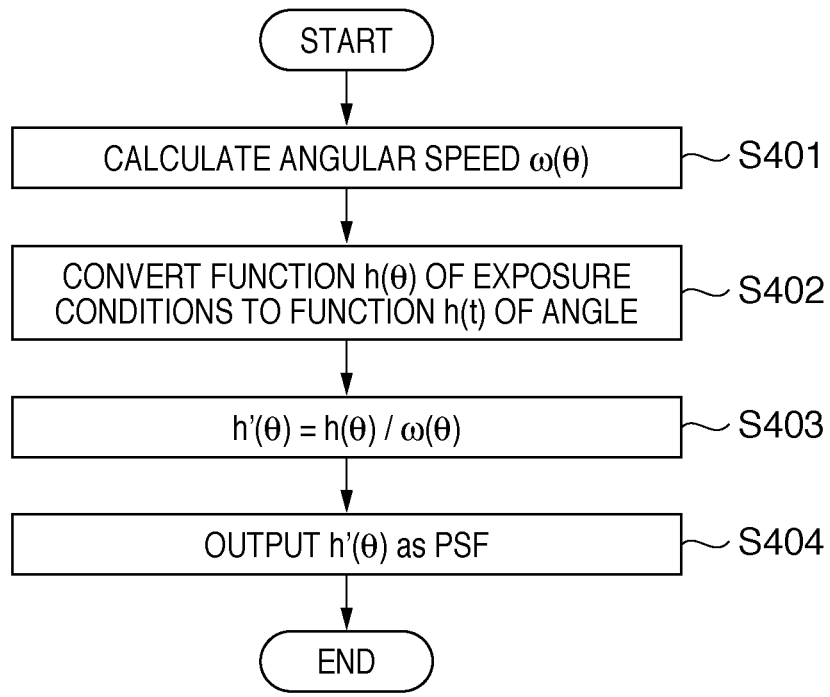
FIG. 4 is a flowchart useful in describing the generation of a PSF (point spread function).

FIG. 4 is a flowchart useful in describing the generation of a PSF (S204).

The information indicating the vibration angle θ and time from the vibration angle measurement unit 105 is input to the PSF generating unit 106, which differentiates the angle θ with respect to time and calculates angular speed ω(t) (S401). By combining the angular speed ω(t) and θ(t), it is possible to express angular speed as a function of θ. Let this function be ω(θ).

Next, on the basis of exposure information indicating the shutter-open time period that enters from the exposure condition recording unit 107 and the information indicating the vibration angle θ and time that enters from the vibration angle measurement unit 105, the PSF generating unit 106 acquires the function h(t) as a function of θ (S402). Let this function be h(θ).

The PSF generating unit 106 calculates h'(θ)=h(θ)/ω(θ) based upon the information acquired (S403) and outputs h'(θ) as PSF. As indication in Equation (3), h'(θ) is the PSF in polar coordinates.

Figure 5:
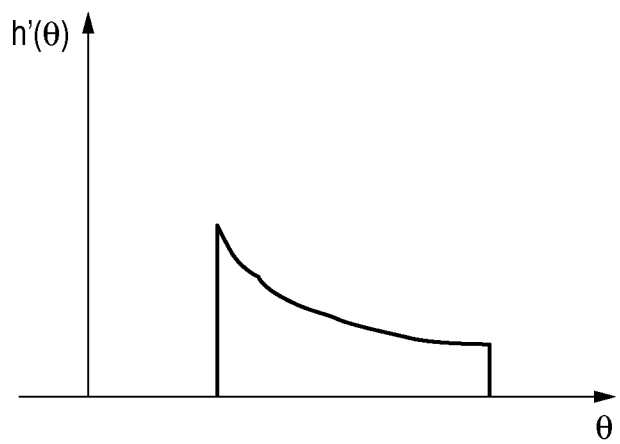
FIG. 5 is a diagram illustrating an example of a PSF in ordinary rotary motion.

FIG. 5 is a diagram illustrating an example of a PSF in ordinary rotary motion. Here the horizontal axis is a plot of angle (in radians) and the vertical axis is a plot of the value of PSF. If h(t)=1 holds in the shutter-open condition 0≤t≤T and h(t)=0 holds otherwise, and accelerating motion is assumed, ω(θ) increases and therefore the value of h'(θ), which is the PSF, decreases.

[Deconvolution]

When Equation (4) is transformed in a frequency space, the following equation is obtained:

$$I_{blur}(f,\rho)=1/T \cdot H'(f,\rho)I(f,\rho) \quad (5)$$

where f represents a variable corresponding to a frequency conversion of r, and ρ represents a variable corresponding to a frequency conversion of Θ.

Since H'(f,ρ) is known, if $I_{blur}(f,\rho)$ is divided by H'(f,ρ) in the frequency space, then, basically, I(f,ρ) can be found. Here, however, a problem arises. This will be described taking into consideration vibration due to motion at a uniform angular speed and assuming that ω(θ) is constant.

Figure 6A:
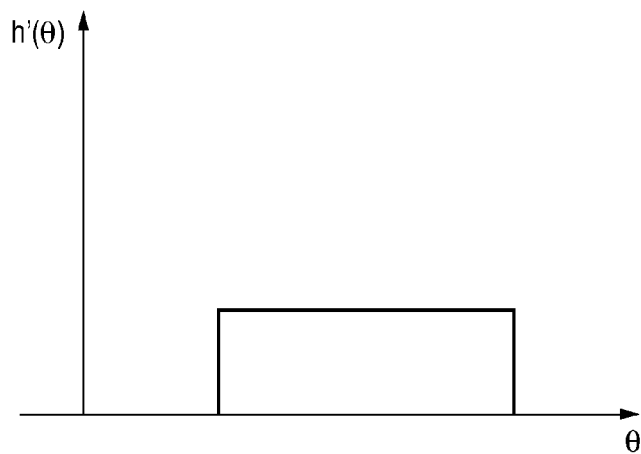
FIG. 6A is a diagram illustrating the shape of PSF of a continuously open shutter in a shutter-open time period.
Figure 6B:
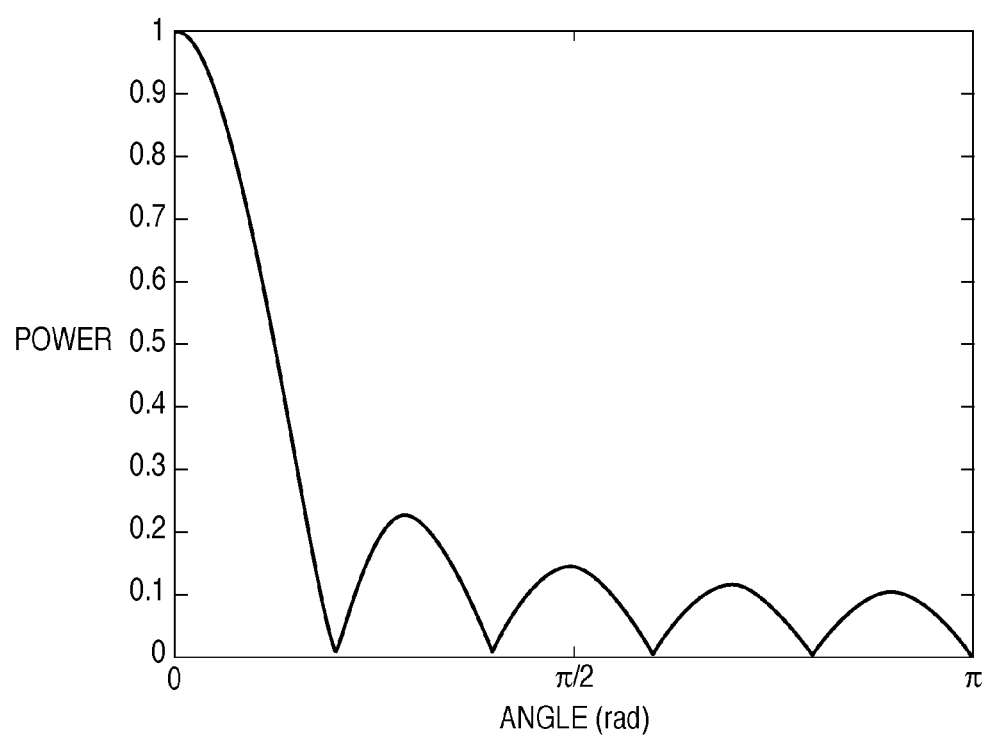
FIG. 6B is a diagram illustrating the frequency characteristic of the PSF shown in FIG. 6A.

FIG. 6A is a diagram illustrating the shape of PSF in a case where h(t)=1 holds in which is the ordinary exposure condition (shutter-open condition), and h(t)=0 holds otherwise (i.e., FIG. 6A illustrates the shape of PSF of a continuously open shutter in a shutter-open time period). FIG. 6B is a diagram illustrating the frequency characteristic of the PSF shown in FIG. 6A. In FIG. 6A, the horizontal axis is a plot of angle (in radians) and the vertical axis is a plot of the value of PSF. In FIG. 6B, the horizontal axis is a plot of angle (in radians) and the vertical axis is a plot of the absolute value of H'(f,ρ).

With reference to FIG. 6B, frequencies appear at which the absolute value becomes zero periodically. This represents loss of information corresponding to these frequencies. If deconvolution is performed in this state, a waveform corresponding to the existence of frequencies at which information has been lost appears. Accordingly, the occurrence of frequencies where information is lost is prevented. In other words, in order to prevent the occurrence of frequencies where the absolute value of the PSF becomes zero, the shutter open/close timing and the length of shutter open (or shutter closed) are controlled randomly in the shutter-open time period (this control will be referred to as "random-opening shutter control" below) and the shutter is opened and closed little by little.

Figure 7A:
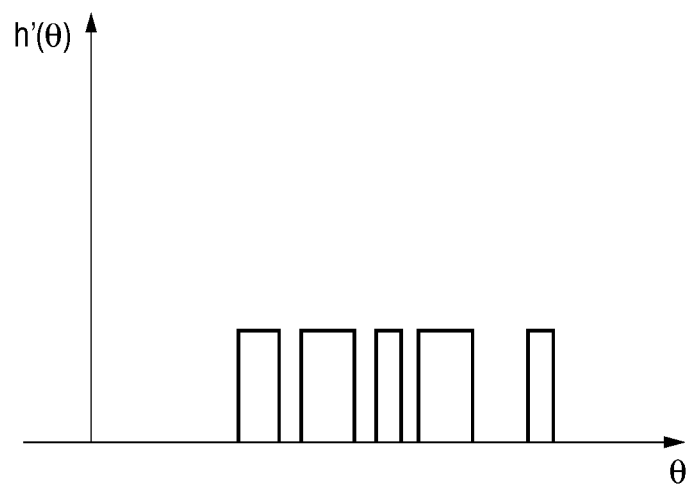
FIG. 7A is a diagram illustrating the shape of a PSF in a case where random-opening shutter control is carried out.
Figure 7B:
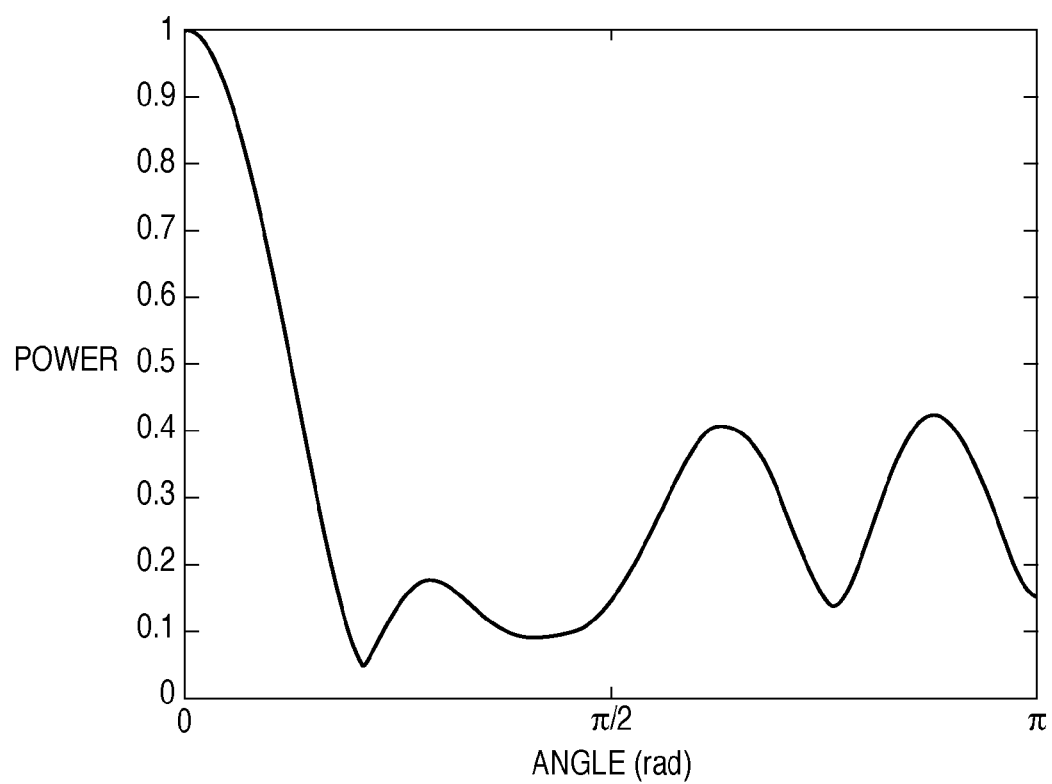
FIG. 7B is a diagram illustrating the frequency characteristic of the PSF shown in FIG. 7A.

FIG. 7A is a diagram illustrating the shape of a PSF in a case where random-opening shutter control is carried out, and FIG. 7B is a diagram illustrating the frequency characteristic of the PSF shown in FIG. 7A.

When random-opening shutter control is carried out, frequencies at which information is lost do not exist. Therefore, if $I_{blur}(f,\rho)$ is divided by H'(f,ρ), complete deconvolution basically becomes possible. It should be noted that random-opening shutter control is performed by a shutter driving unit, described below.

Figure 8A:
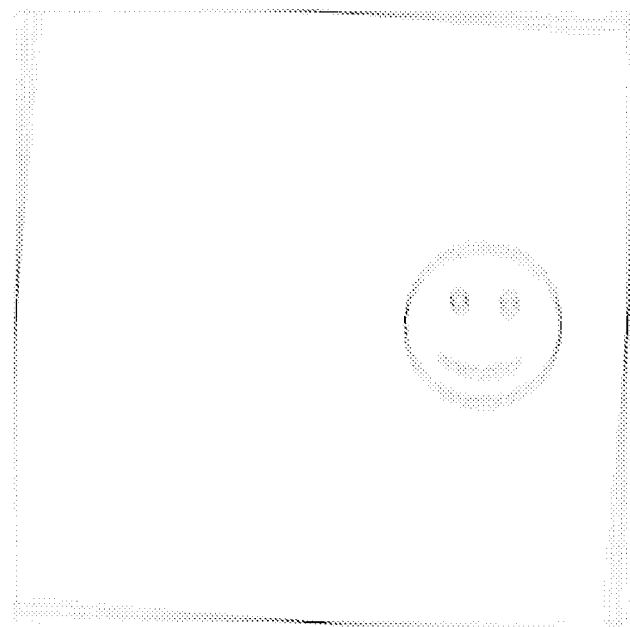
FIG. 8A is a diagram illustrating an image that has undergone rotary vibration.
Figure 8B:
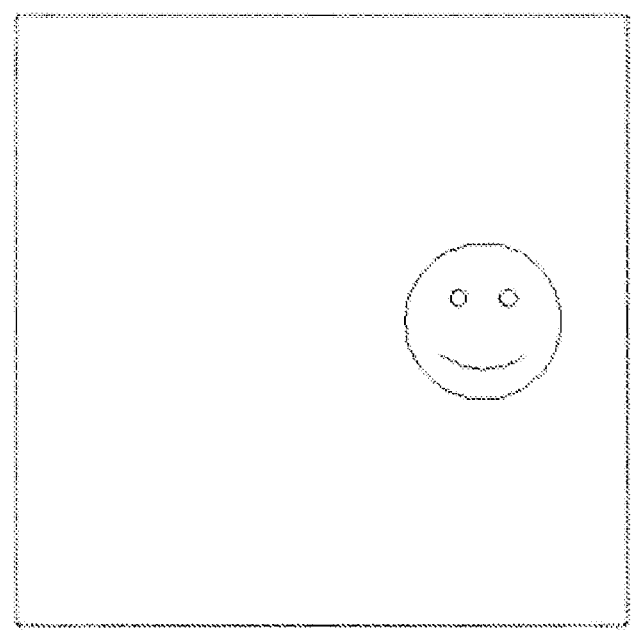
FIG. 8B is a diagram illustrating an image that is the result of correcting for a blur caused by rotary vibration by the image processing unit.

FIG. 8A is a diagram illustrating an image (a simulation) that has undergone rotary vibration, and FIG. 8B is a diagram illustrating an image that is the result of correcting for a blur caused by rotary vibration by the image processing unit.

Thus, by using the information representing the angular speed of rotary vibration and the shutter-open time period as well as the mutual transformation between real space and polar coordinate space and devolution, an image that has been corrected for a blur caused by rotary vibration can be obtained from captured image data of a single image.

Second Embodiment

Image processing according to a second embodiment of the present invention will now be described. Components in the second embodiment similar to those of the first embodiment are designated by like reference characters and need not be described again.

The image processing unit 100 described in the first embodiment does not take vibration other than rotary vibration into consideration. In the second embodiment, an image capturing device that also takes vibration other than rotary vibration into consideration will be described.

Figure 9:
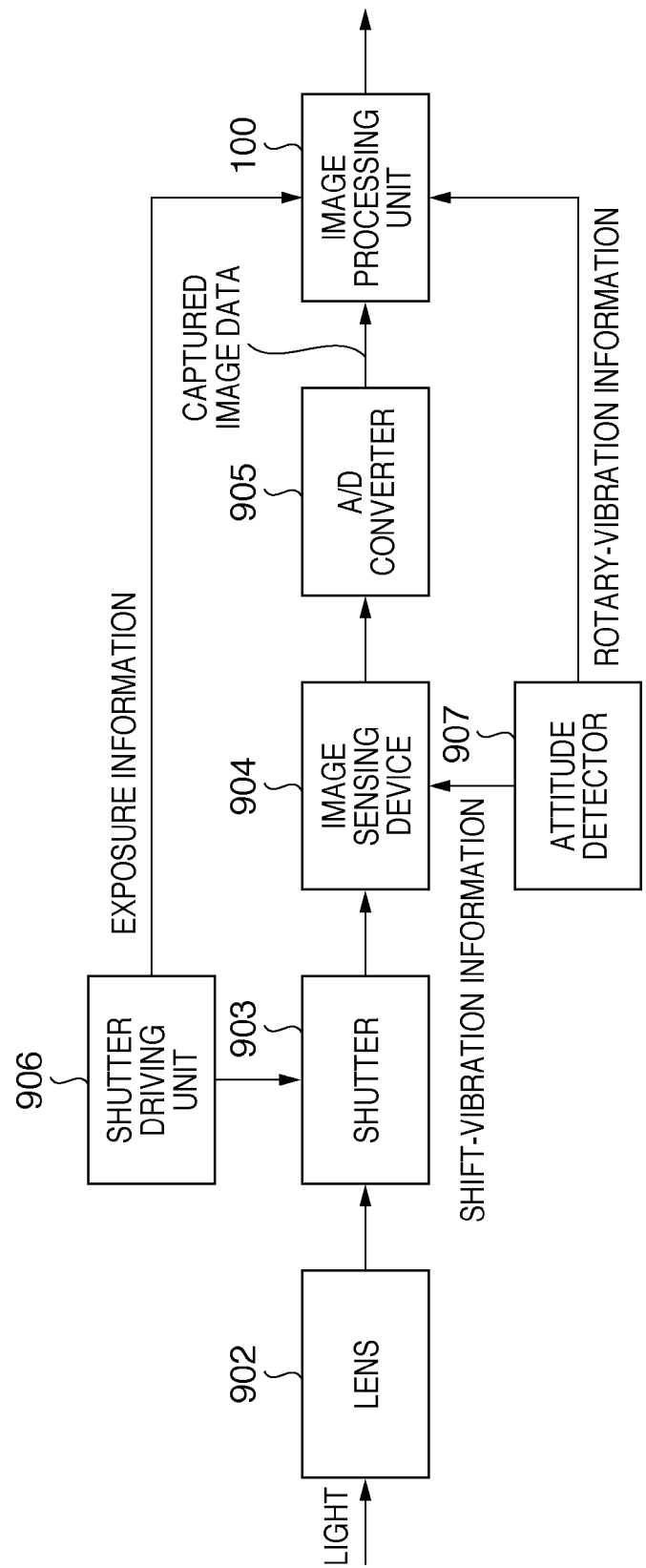
FIG. 9 is a block diagram illustrating the configuration of a capturing unit of an image capturing device.

FIG. 9 is a block diagram illustrating the configuration of a capturing unit of an image capturing device.

Light reflected from a subject forms an image on an image sensing device 904 via a lens 902 and shutter 903. An A/D converter 905 converts an analog signal, which is output by the image sensing device 904, to digital captured image data.

A shutter driving unit 906 implements random-opening shutter control, sets the open/close condition of the shutter 903 and drives the opening and closing of the shutter 903. The above-mentioned exposure information is output to the image processing unit 100.

An attitude detecting unit 907 detects vibration of the image capturing device, classifies the vibration into shift vibration and rotary vibration, outputs shift-vibration information to the image sensing device 904 and outputs rotary-vibration information to the image processing unit 100. The attitude detecting unit 907 may be a device for measuring motion or a device for acquiring a plurality of images and estimation motion.

Figure 10:
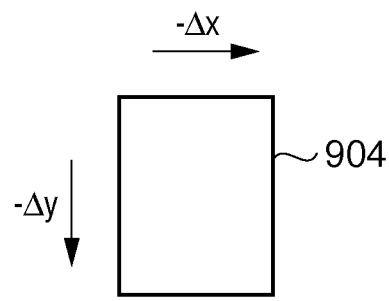
FIG. 10 is a diagram useful in describing correction of shift vibration.

The image sensing device 904 itself moves in accordance with the shift-vibration information and corrects for shift vibration. FIG. 10 is a diagram useful in describing correction of shift vibration. In FIG. 10, $\Delta x$, $\Delta y$ represent amounts of shift vibration detected by the attitude detecting unit 907. The image sensing device 904 is moved counter to the shift-vibration amounts $\Delta x$, $\Delta y$ to thereby correct for shift vibration. It should be noted that shift-vibration correction is not limited to a correction based upon movement of the image sensing device 904 but may also be a correction based upon movement of the lens 902.

On the basis of the rotary-vibration information and exposure information, the image processing unit 100 corrects for rotary vibration of captured image data following removal of shift vibration, as described earlier.

Thus, shift vibration is corrected by an image capturing unit, and rotary vibration, which is difficult to correct by the image capturing unit, is corrected by the image processing unit 100. Complex vibration, which is the result of rotary vibration being combined with shift vibration, can be corrected for in appropriate fashion.

Third Embodiment

Image processing according to a third embodiment of the present invention will now be described. Components in the third embodiment similar to those of the first and second embodiments are designated by like reference characters and need not be described again.

An example in which the image processing unit of the first embodiment is implemented as software will be described in the third embodiment.

Figure 11:
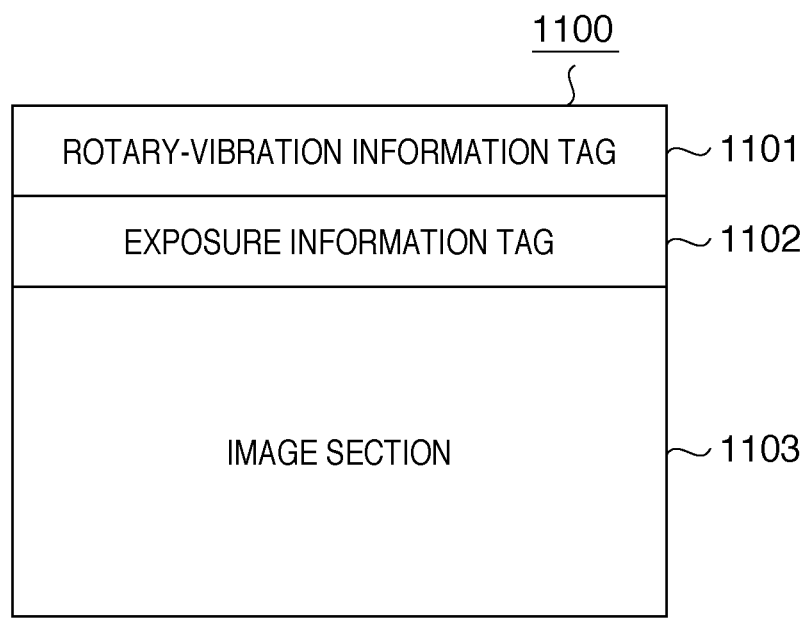
FIG. 11 is a diagram illustrating the format of a captured image data file.

FIG. 11 is a diagram illustrating the format of a captured image data file 1100. The captured image data file 1100 shown in FIG. 11 has a rotary-vibration information tag 1101 in which rotary-vibration information is recorded, an exposure information tag 1102 in which exposure information is recorded, and an image section 1103 in which captured image data is recorded.

By way of example, the CPU of a personal computer executes the functions of the image processing unit 100 implemented as software. When the captured image data file 1100 is input, the CPU corrects for a blur caused by rotary vibration of the captured image data of the image section 1103 based upon the information in the rotary-vibration information tag 1101 and exposure information tag 1102, and outputs captured image data following the correction.

Thus, the captured image data file 1100 having the format shown in FIG. 11 can be read in and a blur caused by rotary vibration of the captured image data can be corrected.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-213225, filed Aug. 21, 2008, which is hereby incorporated by reference herein in its entirety.

The invention claimed is:

1. An image processing apparatus comprising:
a first input unit configured to input image data captured by a capturing unit;
a second input unit configured to input exposure information of the captured image data;
a third input unit configured to input rotary-vibration information indicating rotary vibration around an optical axis of the capturing unit at the time of image capture;
a first converter configured to convert the input captured image data to an image in a polar coordinate space;
a corrector configured to correct for a blur, which is caused by the rotary vibration at the time of image capture, of the converted image in the polar coordinate space based on the exposure information and an angle of rotation of the capturing unit, which is indicated by the rotary-vibration information; and
a second converter configured to convert the image that results from the correction to image data in a real space,
wherein the corrector effects the correction by performing image processing on the converted image in the polar coordinate space.

2. The apparatus according to claim 1, wherein the corrector comprises
a generator configured to generate a point spread function based on the exposure information and the angle of rotation,
wherein the corrector performs the correction by deconvoluting the converted image in the polar coordinate space using the point spread function.

3. The apparatus according to claim 1, further comprising:
a driving unit configured to drive a shutter of the capturing unit, and to output the exposure information; and
a detector configured to detect vibration of the capturing unit from attitude of the capturing unit, and to output the rotary-vibration information.

4. The apparatus according to claim 3, further comprising a unit configured to correct for shift vibration based on amount of the shift vibration of the capturing unit detected by the detector.

5. The apparatus according to claim 3, wherein the driving unit controls open/close of the shutter randomly in shutter-open time period.

6. An image processing method comprising the steps of:
inputting image data captured by a capturing unit;
inputting exposure information of the captured image data;

inputting rotary-vibration information indicating rotary vibration around an optical axis of the capturing unit at the time of image capture;

converting the input captured image data to an image in a polar coordinate space;

correcting for a blur, which is caused by the rotary vibration at the time of image capture, of the converted image in the polar coordinate space based on the exposure information and an angle of rotation of the capturing unit, which is indicated by the rotary-vibration information; and converting the image that results from the correction to image data in a real space, wherein the correcting step effects the correction by performing image processing on the converted image in the polar coordinate space.

7. A non-transitory storage medium storing program code for programming processing to carry out the method set forth in claim 6.

8. The apparatus according to claim 2, wherein the generator calculates an angular velocity (107 ($\theta$)) in the angle of rotation based on a first relationship ($\theta(t)$) between the angle of rotation and time, transforms a second relationship ($h(t)$) between the exposure information and the time into a third relationship ($h(\theta)$) between the exposure information and the angle of rotation based on the first relationship ($\theta(t)$), and divides the third relationship by the angular velocity ($\omega(\theta)$) so as to generate the point spread function ($h'(\theta)$).

\* \* \* \* \*